United States Patent
Birkler et al.

(10) Patent No.: US 9,276,921 B2
(45) Date of Patent: Mar. 1, 2016

(54) SYSTEM AND METHOD FOR ESTABLISHING A COMMUNICATION SESSION

(75) Inventors: Paul Joergen Birkler, Foster City, CA (US); Anton Fedosov, Munich (DE); Jeffrey Blattman, San Jose, CA (US); Richard Walter Rein, Jr., Hayward, CA (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 125 days.

(21) Appl. No.: 14/008,508

(22) PCT Filed: Mar. 30, 2012

(86) PCT No.: PCT/US2012/031342
§ 371 (c)(1),
(2), (4) Date: Mar. 6, 2014

(87) PCT Pub. No.: WO2012/135563
PCT Pub. Date: Oct. 4, 2012

(65) Prior Publication Data
US 2014/0197232 A1    Jul. 17, 2014

Related U.S. Application Data

(60) Provisional application No. 61/469,996, filed on Mar. 31, 2011.

(51) Int. Cl.
*H04L 9/32* (2006.01)
*H04L 29/06* (2006.01)
*G06F 21/31* (2013.01)
*G06Q 20/32* (2012.01)
*H04M 1/2755* (2006.01)
*H04M 1/725* (2006.01)
*H04L 29/08* (2006.01)

(52) U.S. Cl.
CPC .............. *H04L 63/08* (2013.01); *G06F 21/313* (2013.01); *G06Q 20/3276* (2013.01); *H04L 63/18* (2013.01); *H04L 67/141* (2013.01); *H04M 1/2755* (2013.01); *H04M 1/72561* (2013.01)

(58) Field of Classification Search
USPC .......................................... 235/375; 713/183
See application file for complete search history.

(56) References Cited

U.S. PATENT DOCUMENTS

2007/0079135 A1    4/2007  Saito
2009/0293110 A1   11/2009  Koga
2011/0072263 A1    3/2011  Bishop et al.

FOREIGN PATENT DOCUMENTS

EP    1551140 A1    7/2005
EP    2166697 A1    3/2010
EP    2211499 A1    7/2010
JP    2007257179 A  10/2007

*Primary Examiner* — Daniel Hess
(74) *Attorney, Agent, or Firm* — Coats & Bennett, PLLC

(57) ABSTRACT

A server in a communications network establishes a communication channel between a user's device and another device having a display. Particularly, the server generates a Quick Response (QR) code utilizing one or more parameters, and sends it to a device for display to a user. Using his or her device, the user captures an image of the displayed QR code and extracts the parameters using an image analysis technique. The device then sends the extracted parameters back to the server, which then utilizes them to authenticate the user and establish the communications session.

22 Claims, 13 Drawing Sheets

SYSTEM AND METHOD FOR ESTABLISHING A COMMUNICATION SESSION

RELATED APPLICATIONS

This application claims priority to U.S. Provisional Application Ser. No. 61/469,996, filed Mar. 31, 2011 and entitled "System and Method for Establishing a Communication Session." The entire contents of the '996 application are incorporated herein by reference.

FIELD OF THE INVENTION

This invention relates generally to communication systems, and more particularly to the process of establishing a communication session between a user device and a remote device via a communications network.

BACKGROUND

Communicating data between two or more devices is commonplace. However, the methods by which communication sessions are established can be, at times, cumbersome for the user.

For example, many web sites require users to login using a unique username/password combination. This allows the website operator to identify and authenticate the user, as well as to track and monitor his or her actions. Users are generally advised to maintain unique username/password combinations for each site to minimize the dangers presented by malicious third party eavesdroppers; however, this creates a burden on the user to remember many different combinations. Some sites allow the use of a service such as OPENID for identification and authentication purposes. Although this greatly reduces the number of username/password combinations a user must remember, it does not eliminate them altogether because a username/password is still needed for OPENID. Further, manually entering a username/password combination is an especially cumbersome process when performed on a handheld device.

Other common activities also require establishing a communications session and identifying and authenticating the user. For example, a person using a debit card or credit card to perform some protected function, such as purchasing an item or withdrawing cash, is normally required to enter a Personal Identification Number (PIN). Further, different PINs are usually required for different cards. This creates an additional burden on the user to remember the PINs in addition to the many username/password combinations.

With Near Field Communication (NFC) technology, a user need not commit such information to memory. Instead, some or all of the information can be stored in memory on the device, such as the user's cellular telephone, and transferred to an NFC reader when the user places the cellular telephone in close physical proximity to the NFC reader. However, the use of NFC technology for performing such functions is limited because NFC enabled devices are not widely deployed.

SUMMARY

The present invention provides a system and method for establishing a communication session between a user device, such as a cellular telephone, and another consumer electronic device having a display screen, such as a personal computer or web-enabled television. The present invention also provides a method for authenticating the user device so that the user is able to perform protected functions such as log into a desired website, share data with other devices, and authorize payment for different transactions, without having to remember a username/password combination for each function. The present invention is especially useful for hand-held devices in which the small size of the user input interface can make the manual entry of data cumbersome.

Therefore, in one embodiment, the present invention provides a method for establishing a communications session between first and second devices. The method, which is performed at a network server, comprises generating a coded image for display at a first device connected to the network server. The coded image is generated to include embedded data that will be utilized by the network server to authenticate a second device. Once the coded image is generated, the network server sends the coded image to the first device for display to the second device. While on display, the second device captures the coded image and performs an analysis to extract the embedded data. The server then receives, from the second device, the extracted embedded data. Upon receipt, the server authenticates the second device to perform one or more protected functions based on the received embedded data.

The coded image may comprise any coded image known in the art; however, in one embodiment, the coded image is generated to be a 2-dimensional or 3-dimensional bar code for display at the first device. In another embodiment, the coded image is selected by the network server from a predetermined pool of images for display at the first device.

In one embodiment, the network server generates the coded image as a pattern of one or more colors. Each color in the pattern has a color value, and each has an assigned luminescence value that identifies a selected level of luminescence for the color. The server also configures the pattern to change one or more of the colors and/or one or more of the luminescence values in a pre-defined order while the coded image is displayed at the first device. While the pattern is displayed, the second device captures the changing colors and/or luminescence of the colors in an image or a video, for example, and sends data representing the captured changes to the network server. If the changes captured by the second device are deemed by the network server to have occurred in the pre-defined order, the network server authenticates the second device.

In one embodiment, generating a coded image for display at the first device comprises generating the coded image responsive to receiving a request for the coded image from the first device.

In one embodiment, receiving the embedded data comprises receiving the embedded data in an authentication request, from the second device, to communicate with the first device.

Further, in one embodiment, authenticating the second device based on the received embedded data comprises comparing the embedded data received in the authentication request to the embedded data used to generate the coded image at the network server, and authorizing the second device to perform the one or more protected functions based on a result of the comparison. Then, based on the authentication result, the method further comprises establishing a data channel between the first and second devices to communicate data from the second device to the first device, and establishing a control channel between the first and second devices to communicate control commands from the second device to the first device to allow the second device to control rendering the data at the first device.

In one embodiment, establishing a communications link between the first and second devices comprises establishing one or both of the control channel and the data channel between the first and second devices via the network server. For example, the network server may receive an indication of whether the first and second devices were able to directly establish one or both of the control channel and the data channel. Based on that received indication, the method establishes the control channel and/or the data channel between the first and second devices via the network server.

In one embodiment, the method further comprises generating another coded image for display at a third device connected to the network server. This additional coded image is also generated to include embedded data that will be utilized by the network server to authenticate a fourth device. Once generated, the server sends the coded image to the third device for display to the fourth device, and receives, from the fourth device, the embedded data extracted from the displayed coded image by the fourth device. Based on the received embedded data, the network server authenticates the fourth device.

In one embodiment, the method further comprises establishing both a data channel and a control channel between the second and third devices. The data channel carries data from the second device to the third device. The control channel carries control commands generated by the second device to allow the second device to control rendering the data at the third device.

In addition to the method, the present invention also provides a network server configured to perform the method. In one embodiment, the server comprises a communications interface to communicate with a user device and a display device via a communications network, a memory, and a programmable controller. The programmable controller is configured to generate a coded image for display at the display device. The coded image is generated to include embedded data that the controller will use to authenticate the user device. The controller is also configured to send the coded image to the display device for display to the user device, and receive, from the user device, the embedded data extracted from the displayed coded image by the user device. The controller can then authenticate the user device to perform to perform one or more protected functions based on the received embedded data.

In one embodiment, the coded image comprises a 2-dimensional or 3-dimensional bar code for display at the first device. In another embodiment, the coded image comprises an image selected from a predetermined pool of images stored in the memory.

In one embodiment, the coded image comprises a pattern of one or more colors. Each color has an assigned luminescence value that identifies a selected level of luminescence for the color. In this embodiment, the controller generates the pattern to change one or more of the colors and/or one or more of the luminescence values in a pre-defined order while the coded image is displayed at the display device.

In one embodiment, the controller is further configured to generate the coded image responsive to receiving a request for the coded image from the display device. The request may be, for example, an authentication request to communicate with the display device that includes the embedded data sent by the user device. Upon receipt of the authentication request, the controller compares the embedded data received in the authentication request to the embedded data it used to generate the coded image. Based on the results of that comparison, the controller will authorize the user device to perform the one or more protected functions.

In one embodiment, based on the authentication result, the controller is further configured to establish a data channel between the user device and the display device to communicate data from the user device to the display device, and establish a control channel between the user device and the display device to communicate control commands from the user device to the display device to allow the user device to control rendering the data at the display device.

In one embodiment, the controller is further configured to establish one or both of the control channel and the data channel between the first and second devices via the network server.

In one embodiment, the controller is further configured to receive an indication of whether the user device and the display device were able to directly establish one or both of the control channel and the data channel, and establish the control channel and/or the data channel between the user device and the display device via the network server based on the received indication.

In one embodiment, the present invention may be utilized to control the rendering of data other remote display devices in addition to, or in lieu of, the local display device. In such embodiments, the controller is further configured to generate a second coded image for display at a remote display device connected to the network server. The second coded image also includes embedded data that the controller will use to authenticate a remote user device. Once generated, the controller sends the second coded image to the remote display device for display to the remote user device. The controller then receives, from the remote user device, the embedded data extracted from the displayed second coded image by the remote user device. Based on this received embedded data, the controller can authenticate the remote user device.

In one embodiment, the controller is further configured to establish a data channel between the local user device and the remote display device to communicate data from the local user device to the remote display device, and establish a control channel between the local user device and the remote display device to communicate control commands from the local user device to the remote display device to allow the local user device to control rendering the data by the remote display device.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention provides a system and method for establishing a communication session between a user device, such as a cellular telephone, and another consumer electronic device having a display screen, such as a personal computer or web-enabled television. The present invention also provides a method for authenticating the user device so that the user is able to perform protected functions as log into a desired website, share data with other devices, and authorize payment for different transactions, without having to remember a username/password combination for each function. The present invention is especially useful on hand-held devices in which the small size of the user input interface can make the manual entry of data cumbersome.

Figure 1:
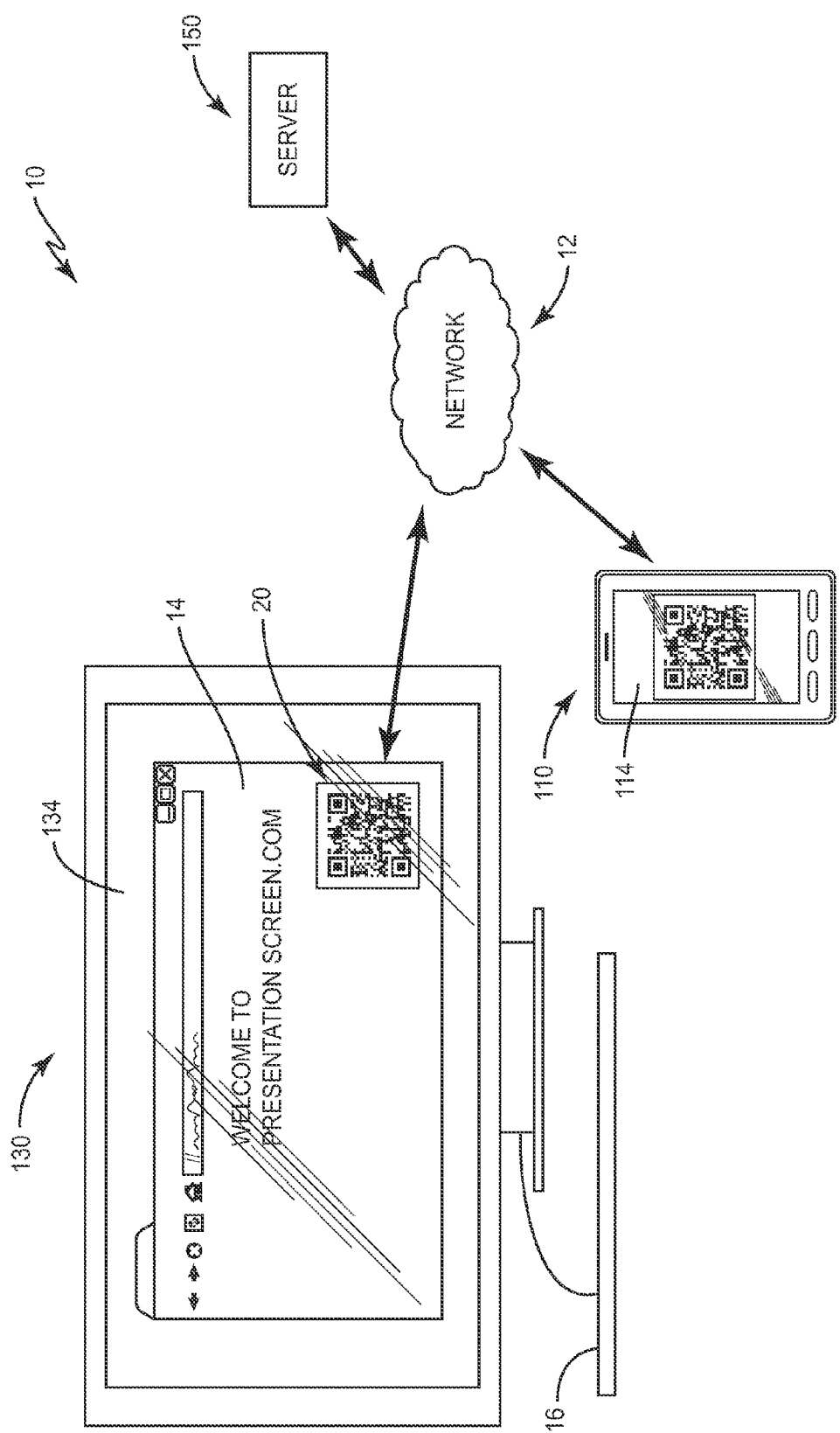
FIG. 1 is a block diagram illustrating some of the components of a communication system configured according to one embodiment of the present invention.

Turning now to the drawings, FIG. 1 is a block diagram illustrating some of the components of a communications system 10 configured to operate according to one embodiment of the present invention. As seen in FIG. 1, system 10 comprises a communications network 12 that communicatively interconnects a user device 110, a web-enabled consumer electronic device 130, and a network server 150. The user device 110 and the consumer electronic device 130 are illustrated as being a camera-equipped cellular telephone, and a web-enabled television display, respectively. However, those skilled in the art should appreciate that this is for illustrative purposes only. As seen later in more detail, the user device 110 and/or the consumer electronic device 130 may comprise other electronic devices capable of communicating data over a communications network.

In one embodiment, the user device 110 communicates data and other signals with server 150 and device 130 via network 12 using one or more of any of a variety of well-known protocols. Some exemplary protocols include, but are not limited to, those compliant with the standards known generally as the Global System for Mobile Communications (GSM), the General Packet Radio Service (GPRS), cdma2000, Universal Mobile Telecommunications System (UMTS), Wideband Code Division Multiple Access (WCDMA), 3GPP Long Term Evolution (LTE), Worldwide Interoperability for Microwave Access (WiMAX), and Wireless Local Area Network (WLAN) or other 802.11x interface. In another embodiment, user device 110 communicates data and signals directly with device 130 via a short-range communication link established and operating according to a well-known standard such as an 802.11x standard, BLUETOOTH or InfraRed (IrDA). As will be understood from the following specification, the exact protocol or standard used to facilitate communications between device 110 and device 130 is not germane to the present invention.

Device 130 is also configured to communicate with server 150 via network 12. Typically, the Transmission Control Protocol/Internet Protocol (TCP/IP) is used to communicate messages between device 130 and server 150, but other protocols may be used as needed or desired. Device 130 includes a display 134 and is configured to communicate with one or more web servers via the Internet using a message formatted according to the HyperText Transfer Protocol (HTTP). A user may, if desired, employ a keyboard 14 or other user input interface associated with device 130 to launch a browser application that provides a browser window 16. As is known in the art, the user can enter a Uniform Resource Indicator (URI) identifying a specific web site into the URI address field of the browser window 16. The browser sends HTTP request messages to the server 150 via network 12 requesting the desired web page. In response, the server 150 returns HTTP response messages to the device 130 that provide the code, graphics, and media associated with the requested web page for display in the browser window 16.

Server 150 may be a host server that hosts a web site, or it may be a server that handles traffic requests to a host server. In any case, server 150 is configured to facilitate establishing a communications link between device 110 and device 130, and, in some instances, to communicate data between the devices 110, 130. Server 150 is also configured to authenticate user device 110 automatically without requiring the user to remember a plurality of user/name password combinations, or to manually enter the combinations.

More specifically, server 150 is configured to provide device 130 with a code responsive to receiving certain predefined events or requests from device 130. The code may be, for example, a Quick Response (QR) code 20 having embedded information generated by server 150, or some other network entity. As is described in more detail later, the user's device 110 captures an image of the QR code 20, and then processes the image to extract the embedded information. Device 110 can then send the extracted information to server 150, which uses the information to, inter alia, authenticate device 110 and establish the communications link between the device 110 and device 130.

As previously stated, the present invention may be used to perform many different functions that require a username and a password. One such function, which is used here to illustrate the present invention, is the sharing of data between devices 110, 130. For example, consider a user of device 110 that has a plurality of stored images that he wishes to share with others. Because device 110 is a "SMARTPHONE," it is possible for some people to gather near the device 110 to view the images on display 114. However, the size of display 114 is relatively small when compared to the sizes of other displays, such as display 134. Therefore, device 110 may not be the best device with which to view the user's pictures. Rather, display 134 may be better suited to display the user's images because of its larger size.

Conventionally, the user would upload the images to device 130 either directly or indirectly via network 12 so that others can view them. However, conventional upload methods are neither easy nor straightforward. For example, the user could connect device 110 directly to the device 130 using cables. However, cables are often expensive and unwieldy. Further, once connected, device 110 must be configured to output the images while device 130 must be configured to receive the images. Alternatively, some conventional configurations (e.g., home-based networks) require additional components such as modems, routers, and Digital Living Network Alliance (DLNA) compliant recorders and clients. Other conventional methods require the user to access a web service such as PICASA via the Internet, to store and share images.

In each case, the user is forced to pay additional costs and/or perform additional functions or actions simply to establish communication between the devices 110, 130. For example, some of the cables used in direct cable connections (e.g., HDMI cables) can be very expensive. Further, when configuring the components of a home network, the user typically has to read and understand one or more complex sets of instructions.

For Internet-based service solutions, the user will have to navigate to a web site managed by a service, such as PICASA, that stores the images for the user. To use these services, the user must first create an account and login to the service. Not only is this time consuming, but the service may also require the user (and others that view the images) to provide a unique username/password combination. As stated above, this process can be cumbersome, especially when the user must manually enter such data using the miniaturized keypad interface provided with most SMARTPHONES. However, the present invention addresses these issues using QR code technology to identify and authenticate a user device, as well as to set up communications links between devices 110, 130.

Figure 2:
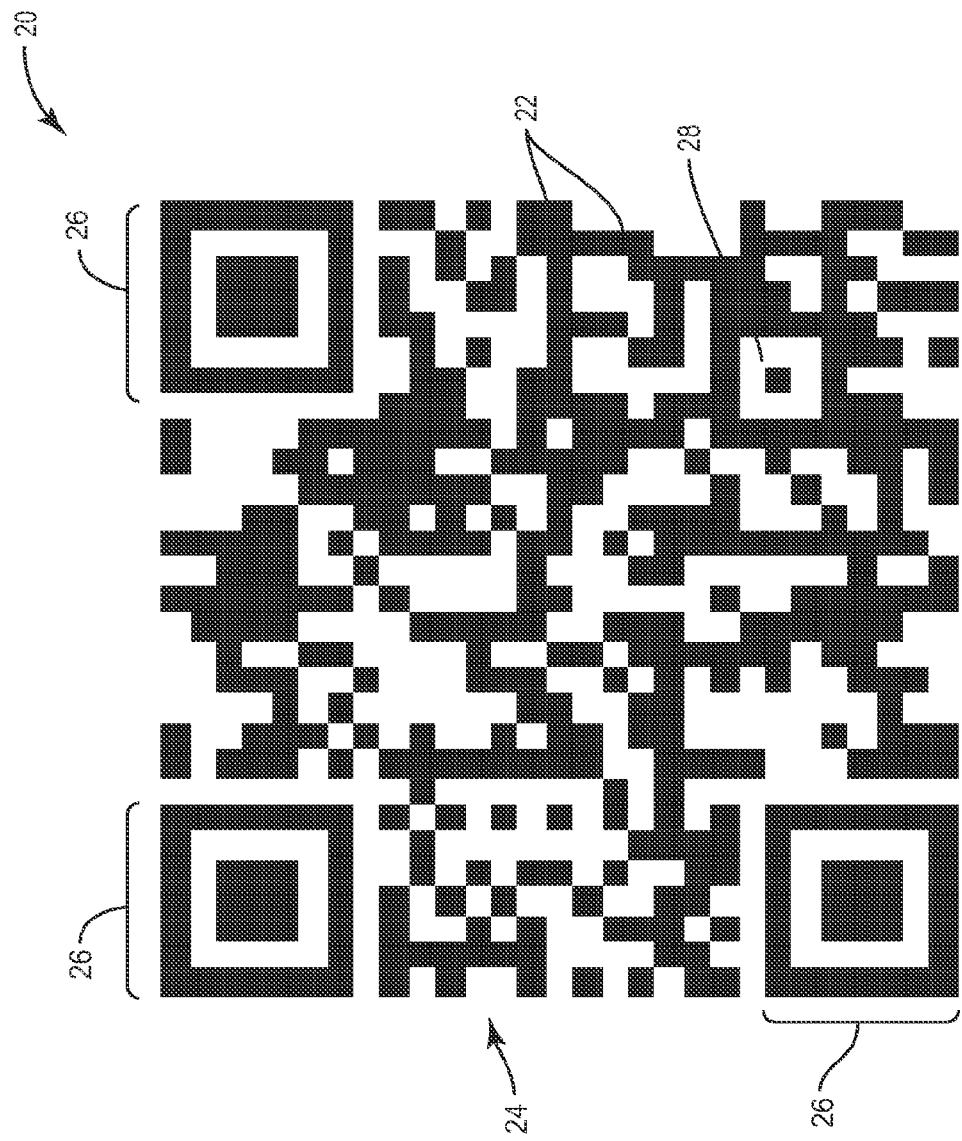
FIG. 2 is a perspective view of a Quick Response code generated according to one embodiment of the present invention.

FIG. 2 illustrates a typical QR code 20 that could be used in one embodiment of the present invention. QR codes are well known in the art, and thus only a brief synopsis is provided here for clarity. However, for more information regarding this technology, the interested reader is directed to the standards document identified by reference number ISO/IEC 18004: 2006, and entitled, "Information technology—Automatic identification and data capture techniques—QR Code 2005 bar code symbology specification," as well as to that standard's Technical Corrigendum 1 identified by reference number ISO/IEC 18004:2006/Cor.1:2009(E). Those two documents were published on Sep. 1, 2006, and Mar. 3, 2009, respectively, by the International Organization for Standardization (ISO), and are incorporated herein by reference in their entirety.

As seen in FIG. 2, the QR code 20 is a 2-dimensional matrix bar code comprising encoded information in both vertical and horizontal directions. In use, devices, such as device 110, optically scan the QR code 20 to extract the encoded information. Typical QR codes 20 consist of a plurality of black modules 22 arranged in a data area 24 as a square pattern on a white background. Most QR codes 20 in use currently are 2-D matrices; however, 3-D QR codes and QR codes having color are now being used in some areas, and are equally as suitable for use in the present invention.

The pattern of modules 22 in the QR code 20 contains the encoded data. Because the QR code 20 contains such data in both the vertical and horizontal directions, the QR code 20 is capable of containing several thousands of bytes of alphanumeric information. Thus, it is possible to encode a large amount of information into the QR code 20. The information may comprise any kind of alpha-numeric text such as numbers, URIs, or email messages, for example. The present invention can utilize this information to aid the user in performing functions such as logging in to a desired website, sharing data with other devices, and authorizing payment for different transactions.

The QR codes 20 are scanned using optical devices or cameras. Thus, QR code 20 is generated to include several patterns that will assist device 110 in such scanning operations. For example, the QR code 20 may be generated to include a plurality of positioning patterns 26. One pattern 26 is located at each of three corners of the data area 22. The positioning patterns 26 enable the device 110 to scan the QR code 20 from any angle at high speed. Therefore, the user is not required to capture an image of a QR code 20 at any one specific angle. Other patterns that assist device 110 in scanning operations are the alignment pattern 28 and the timing pattern. Although the timing pattern is not explicitly identified in FIG. 2, those skilled in the art will nevertheless appreciate that the timing pattern comprises of a plurality of square modules that extend vertically and horizontally between each of the positional patterns 26.

Figure 3:
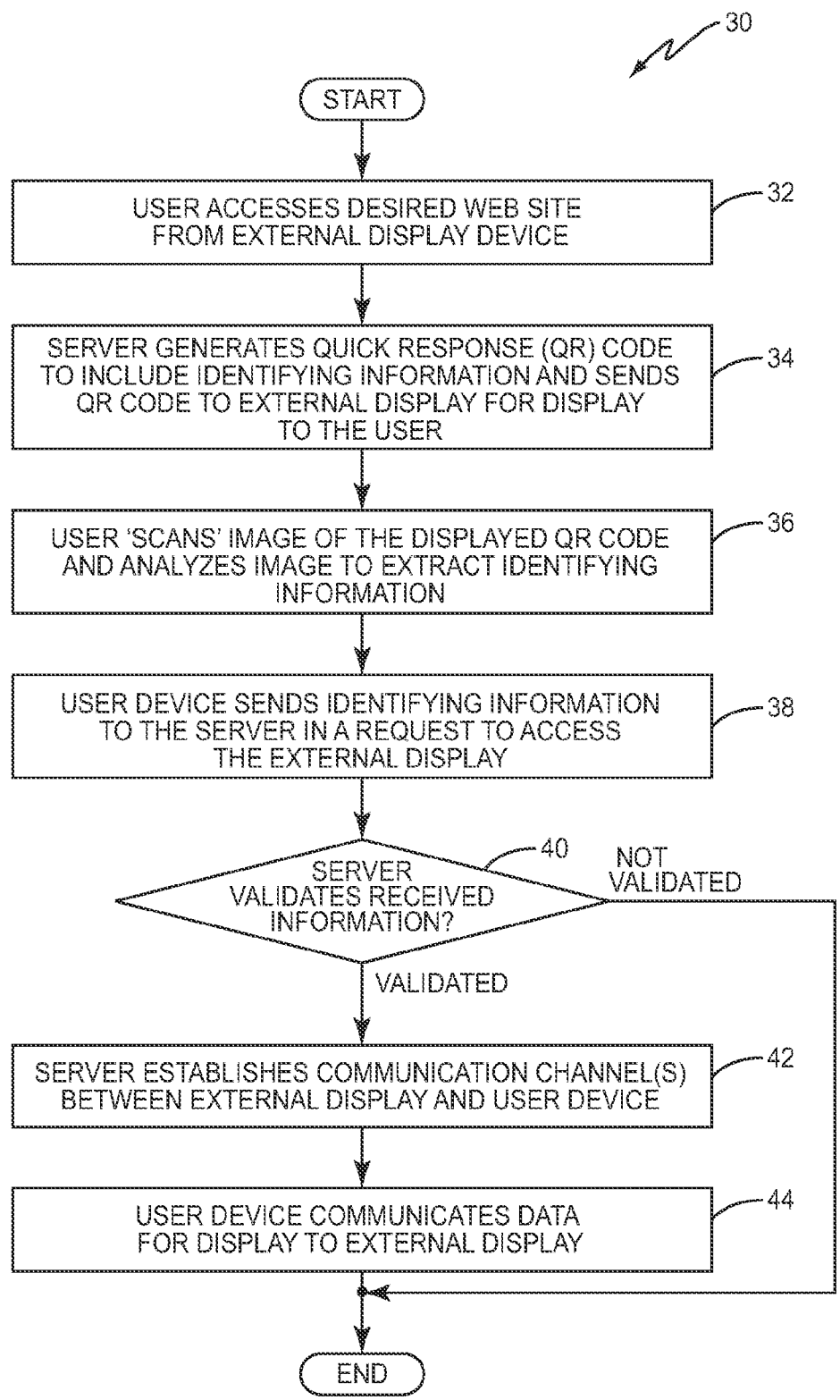
FIG. 3 is a flow chart illustrating a method of establishing a communication session according to one embodiment of the present invention.

FIG. 3 is a flow diagram that broadly illustrates a method 30 of establishing a communication link between device 110 and device 130 according to one embodiment of the present invention. For illustrative purposes only, method 30 is discussed in the context of a user sharing images stored on his cellular telephone (i.e., device 110) by displaying them on a web-enabled television (i.e., device 130).

Method 30 begins with the user accessing a desired web site from device 130 (box 32). This may be accomplished, for example, by utilizing a keyboard or other user input mechanism to provide a URI identifying a desired web site into the browser application address field. Upon receipt of the request from device 130, the server 150 generates the QR code 20 to include certain identifying information and data, and sends it to device 130 for display on display 134 (box 34). Once displayed, the user employs the camera function on device 110 to capture the image of QR code 20. A software module in device 110 then analyzes the image to extract the identifying information embedded in the QR code 20 (box 36), and sends the information to server 150 along with a request to access the device 130 (box 38).

Since server 150 generated the identifying information, server 150 can validate the information received from device 110. For example, server 150 may store the information is uses to generate the QR code 20 in its memory. Upon receiving the information from device 110, device 130 could compare it to the stored information. If the identifying information server 150 receives from device 110 does not match the stored data, device 110 is not a valid device (box 40). Access is therefore denied and the process ends. However, if the identifying information does match the stored data, device 110 is a valid device (box 40). The server 150 can authenticate device 110 and establishes one or more communications channels between device 110 and device 130 (box 42). Once communications have been established, device 110 can send the images to the device 130 for display on display 134 (box 44).

As seen in FIG. 3, the present invention alters the process for authenticating a device and accessing a website. Historically, authentication was accomplished using a username/password message exchange in which the user/name and password were unique to the user. In method 30, however, server 150 authenticates device 110 without requesting or otherwise prompting for such information. This is because server 150 generated the information encoded in the QR code 20. When that same information is provided back to the server 150, the server 150 can be certain that the user device 110 belongs to the same user that caused the QR code 20 to be generated when they accessed the web site.

Additionally, as seen in FIG. 3, server 150 establishes at least two communications channels to allow the transfer of data between the device 110 and the device 130. One channel is a data channel over which the device 110 sends the media data (e.g., images, video, audio, etc.) to device 130. The other channel is a control channel over which device 110 sends control commands to device 130. Device 110 may send control commands such as PLAY, PAUSE, STOP, REWIND, and FAST FORWARD to control how device 130 renders the media it receives from device 110. Device 110 may also send commands to identify specific servers, user devices, identify specific content, or cause server 150 to translate data into a format understood by device 130. By way of example, device 110 may store a POWERPOINT presentation as a PPTX file. If device 130 cannot natively handle this file type, device 110 could send a command to trigger server 150 into converting each slide in the file to a JPEG image (or other format) that device 130 is able to display.

Figure 4:
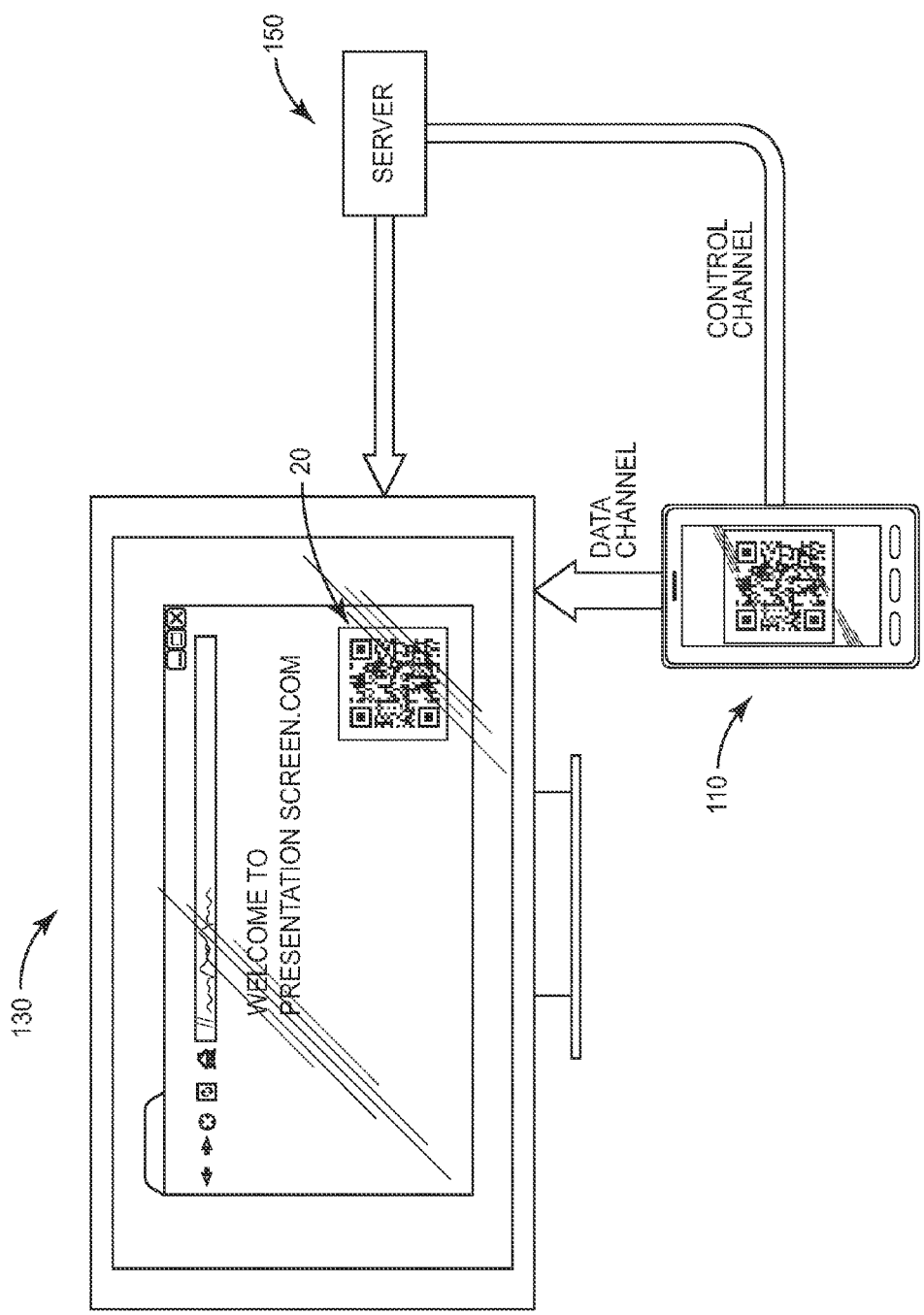
FIG. 4 is a block diagram illustrating communications channels established between components of a system configured to operate according to one embodiment of the present invention.

Establishing the control and data channels may be done in one of two ways. In a first embodiment, seen in FIG. 4, the control channel is established through the server 150. Thus, to control the device 130, the user's device 110 generates and sends control commands to the server 150, which then executes them, or forwards them, to device 130. If needed, server 150 can convert the commands received from device 110 into commands understood by device 130 before sending them to device 130 (and vice versa). Thus, device 130 and device 110 can be wholly independent of the other. The data channel, however, is established to allow direct communications of the data between the two devices 110, 130. To facilitate such direct communications links, each device 110, 130 includes a short-range communications interface, such as a BLUETOOTH interface, that allows the devices 110, 130 to exchange data.

Figure 5:
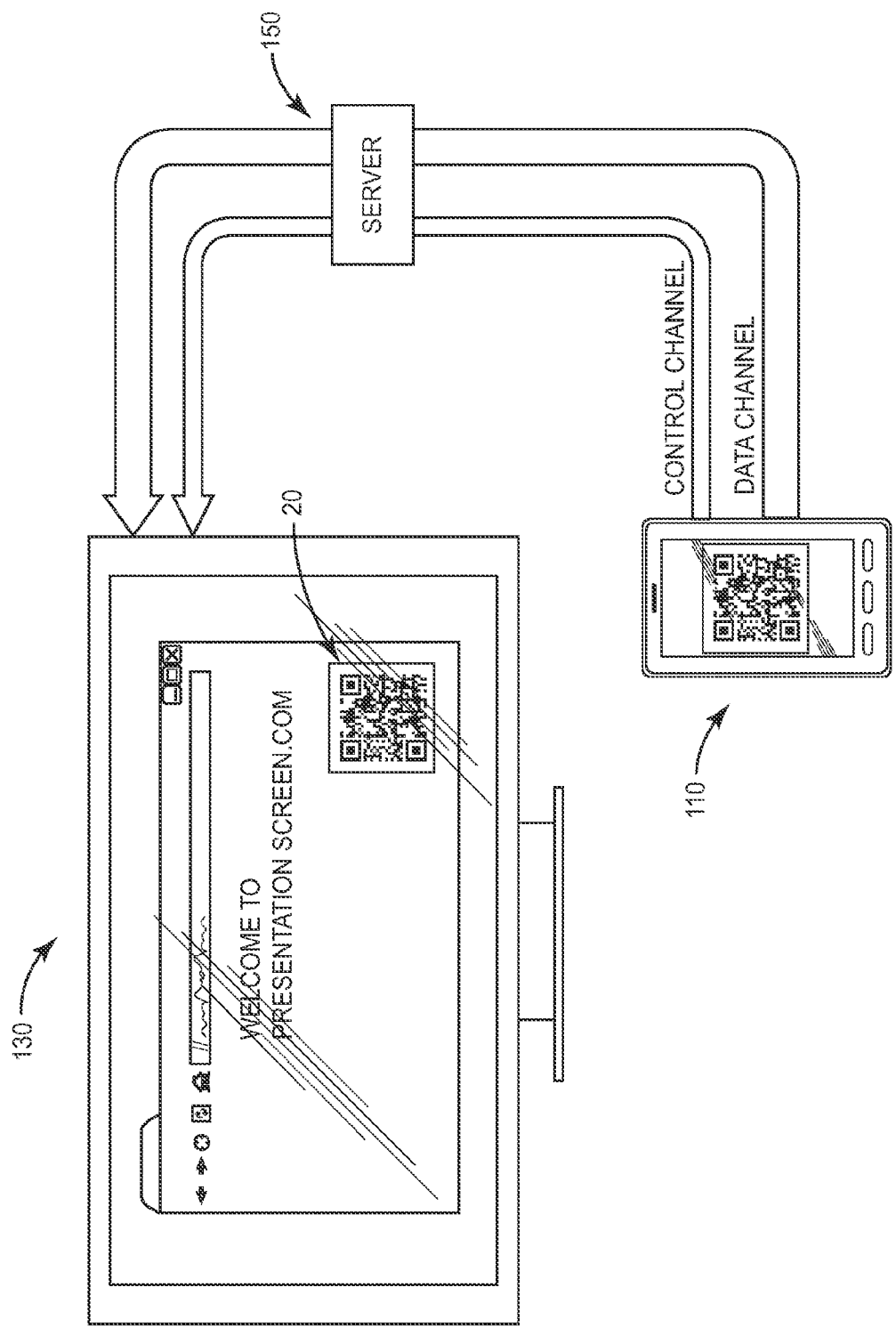
FIG. 5 is a block diagram illustrating communications channels established between components of a system configured to operate according to another embodiment of the present invention.

In some cases, short-range communications between devices 110, 130 are not always possible. Therefore, in a second embodiment seen in FIG. 5, the present invention establishes both the control channel and the data channel through server 150. This embodiment has an additional benefit in that the server 150 can translate or convert the data being provided by device 110 from a format native to device 110 to a format native to device 130.

Figure 6:
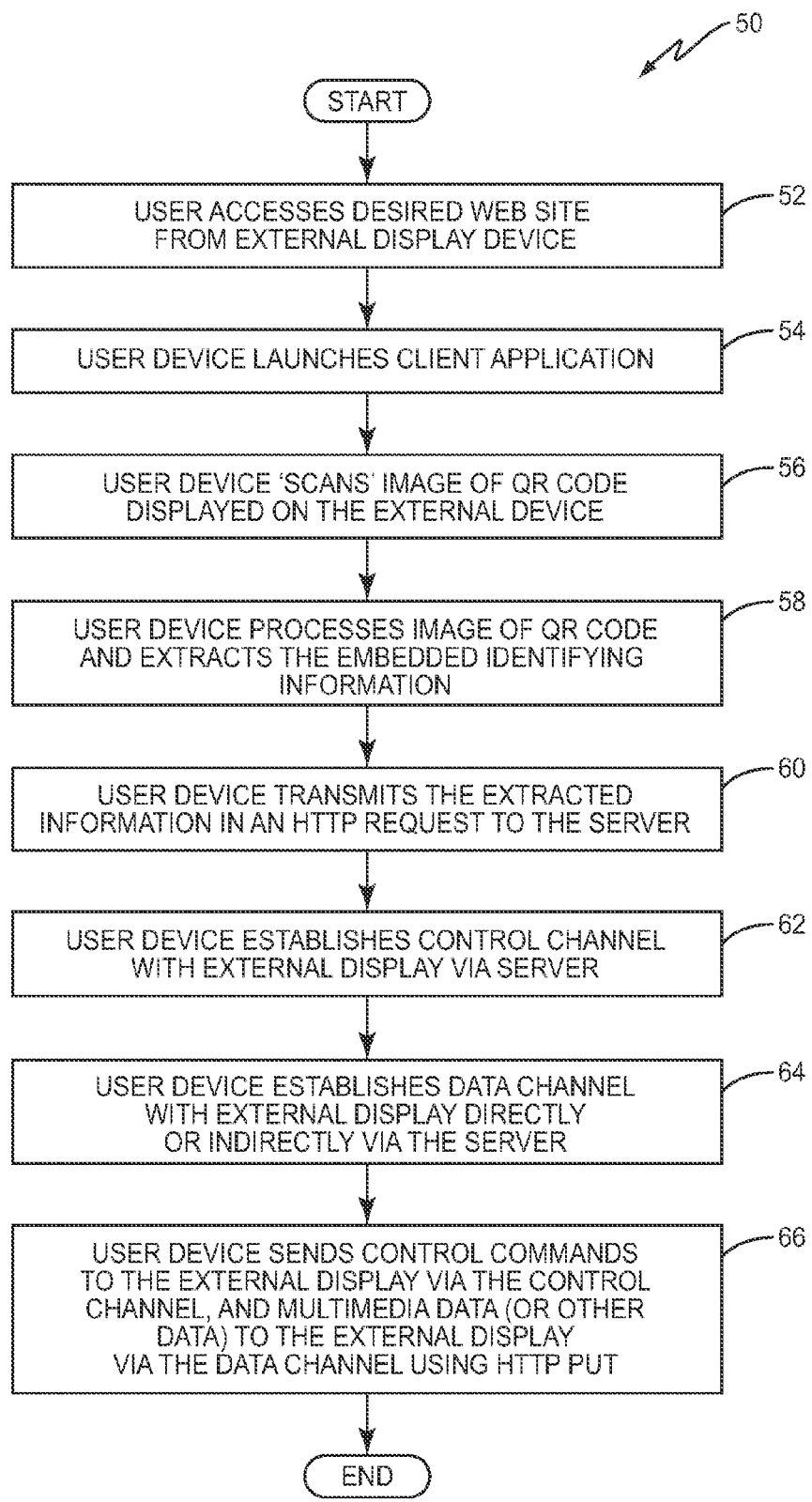
FIG. 6 is a flow chart illustrating a method of establishing a communications session according to one embodiment of the present invention as performed at a user's device.
Figure 7A:
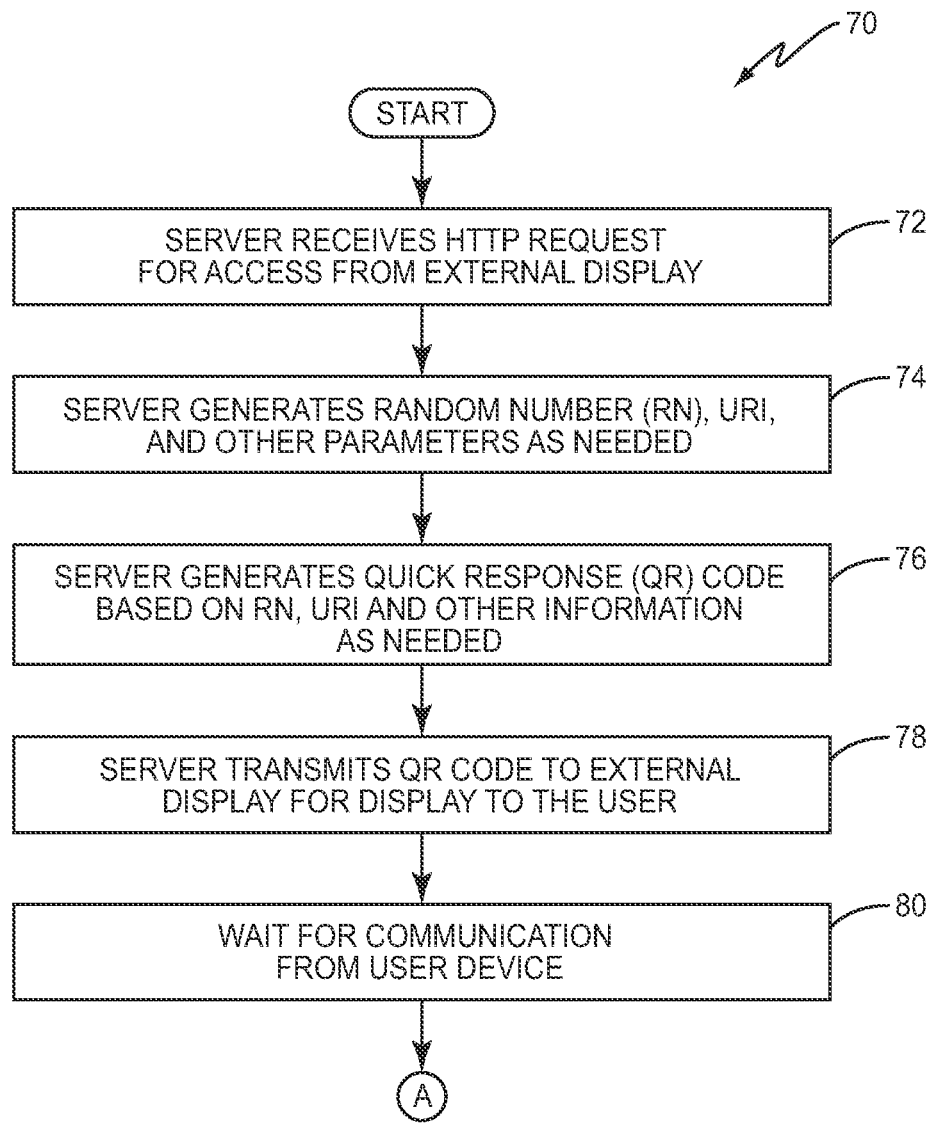
FIGS. 7A-7B are flow charts illustrating a method of establishing a communications session according to one embodiment of the present invention as performed at a network server.
Figure 7B:
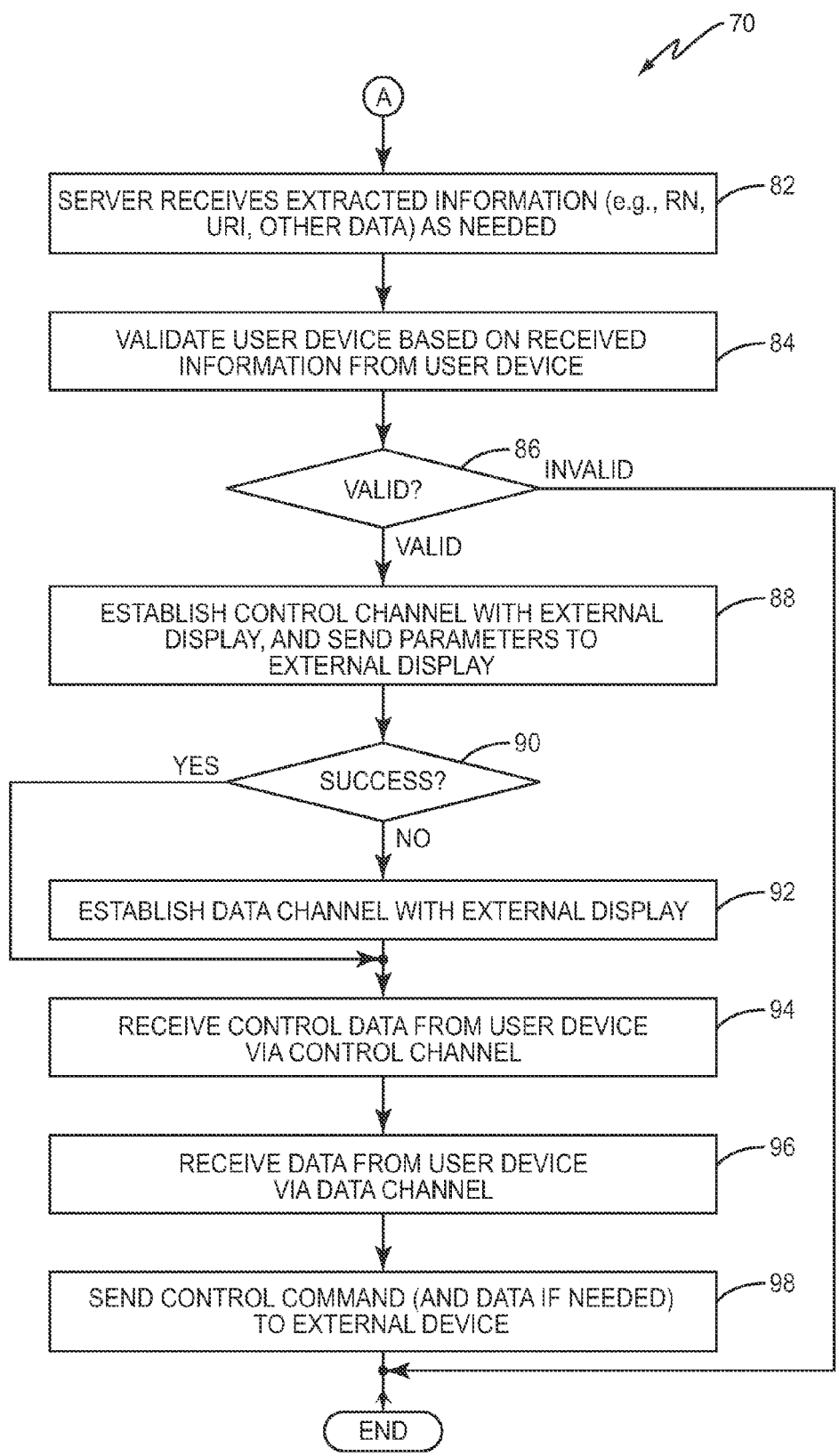

FIGS. 6 and 7A-7B are flow diagrams that illustrate this method of the present invention in greater detail. FIG. 6 illustrates functions as performed at the user's device 110, whereas FIGS. 7A-7B illustrate the functions performed at server 150.

Method 50 (FIG. 6) begins when the user utilizes keyboard 14, or other user 10 interface, to access a desired web site (box 52). When this occurs, server 150 will generate and send the QR code 20 to device 130 for display on display 134. While waiting for the QR code 20 to be displayed, however, the user launches a client application on device 110 that will be used to process the image of the QR code 20 (box 54).

Once the QR code 20 is displayed, the user employs the camera function of device 110 to capture an image of the QR code 20 (box 56). The application executing on device 110 processes the image to extract the embedded information (box 58). The embedded information may comprise, for example, a random number, a session ID, and a pair of URIs. Device 110 then transmits the extracted information to server 150 in an HTTP message (box 60).

As described in more detail later, the random number and the session ID will be used by the server to identify and authenticate the user device 110. However, the URIs are utilized by device 110 to establish the communications channels. Particularly, one of the URIs identifies a server in network 12 with which device 110 will establish a control channel (box 62). The other URI, however, identifies the address of device 130. As previously described, the data channel between devices 110 and 130 may be a direct channel, or an indirect channel through server 150. Therefore, the device 110 will first attempt to establish the data channel directly with device 130 using a first URI provided with the QR code 20 (box 64). If successful, devices 110, 130 will communicate data over that channel. If it fails, however, device 110 will establish a data channel using the second URI, which may be the URI of server 150 or some other server in network 12 (box 64). Once the channels have been established, however, the user device 110 is able to send media and/or other data to device 130 using HTTP PUT messages via the data channel, and control commands to server 150 via the established control channel (box 66).

Method 70 (FIGS. 7A-7B) begins when server 150 receives an HTTP message from the device 130 requesting access to a web site, for example (box 72). Upon receiving the request, the server 150 generates a random number, a session ID, and the pair of URIs (box 74). Server 150 then uses those parameters as input to generate the QR code 20 (box 76). Server 150 may also generate other parameters as needed or desired, and use them in addition to, or in lieu of, one or more of the other parameters. Once the QR code 20 is generated, server 150 sends the QR code 20 to the device 130 (box 78) and waits to receive a message from the user (box 80).

When server 150 receives the extracted data from the QR code 20 from device 110, server 150 can authenticate or validate device 110. (box 82). As previously stated, server 150 generated the parameters for QR code 20. Therefore, server 150 will be able to identify and authenticate the device 110 based on a comparison of those received parameters to corresponding parameters stored at server 150 (box 84). If device 110 is not authenticated (box 86), the process ends. If device 110 is successfully authenticated, however, sever 140 will perform the requisite functions to establish the control channel with device 110 and device 130 (box 88). Server 150 also receives an indication from device 110 as to whether it was successful at establishing a short-range communications link with device 130. If not (box 90), server 150 will establish the data channel through to device 130 to connect devices 110 and 130 (box 92). If it was successful, however, server 150 will simply bypass that step. Once both channels have been successfully established, server 150 receives control data and commands from device 110 via the control channel (box 94). Depending on whether device 110 was successful in establishing a direct, short range link with device 130, server 150 may also receive data from device 110 via the established data channel (box 96). The server 150 will then relay the control commands and/or the data sent by device 110 to device 130 for rendering on display 134 (box 98).

Figure 8:
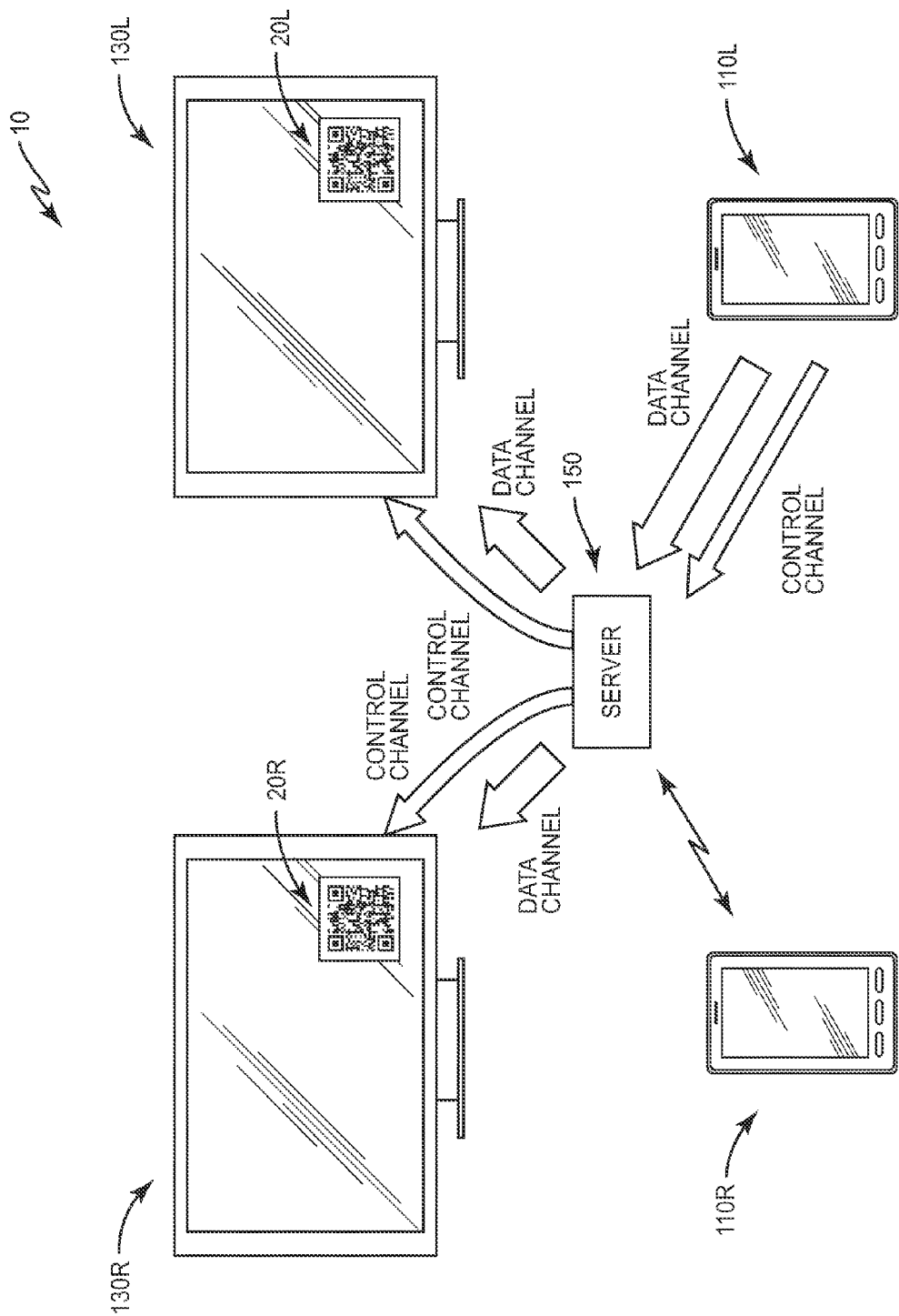
FIG. 8 is a block diagram illustrating some of the components of a communications system configured to operate according to another embodiment of the present invention.

The previous embodiments illustrate the present invention as it may be used to share images or other media stored in memory of a user's device 110 with others by communicating that media to a device 130 having a larger display 134. In those previous embodiments, the user with device 110 was co-located with device 130. However, the invention is not so limited. FIG. 8 illustrates another embodiment of the present invention wherein the user device 110 can share the images or other data with a remote user having a device 110 and 130.

In this embodiment, the user sharing the images establishes the communications channels with server 150 and/or local device 130L as previously described. Once established, however, the user can then send a command to server 150 to establish a control channel and a data channel with remote device 130R. More particularly, the user of device 110L could identify the remote user to server 150 using information stored in personal contact book stored at device 110L. Upon receipt of the request, server 150 could generate and send another QR code 20 to remote device 130R using the same or new parameters. Once displayed on remote device 130R, the user would scan the QR code 20 using a camera function of remote device 110R and launch an application to extract the embedded parameters. The remote device 110R would then send the extracted parameters to the server 150 for authentication purposes and to identify the session to join. If the remote device 110R is successfully authenticated, server 150 would establish additional control and data channels with the remote device 130R, and send and control the media provided by device 110L to the remote device 130L as well. Thus, the present invention allows one user to share media with other people, even if those people are not co-located geographically with the user.

Figure 9:
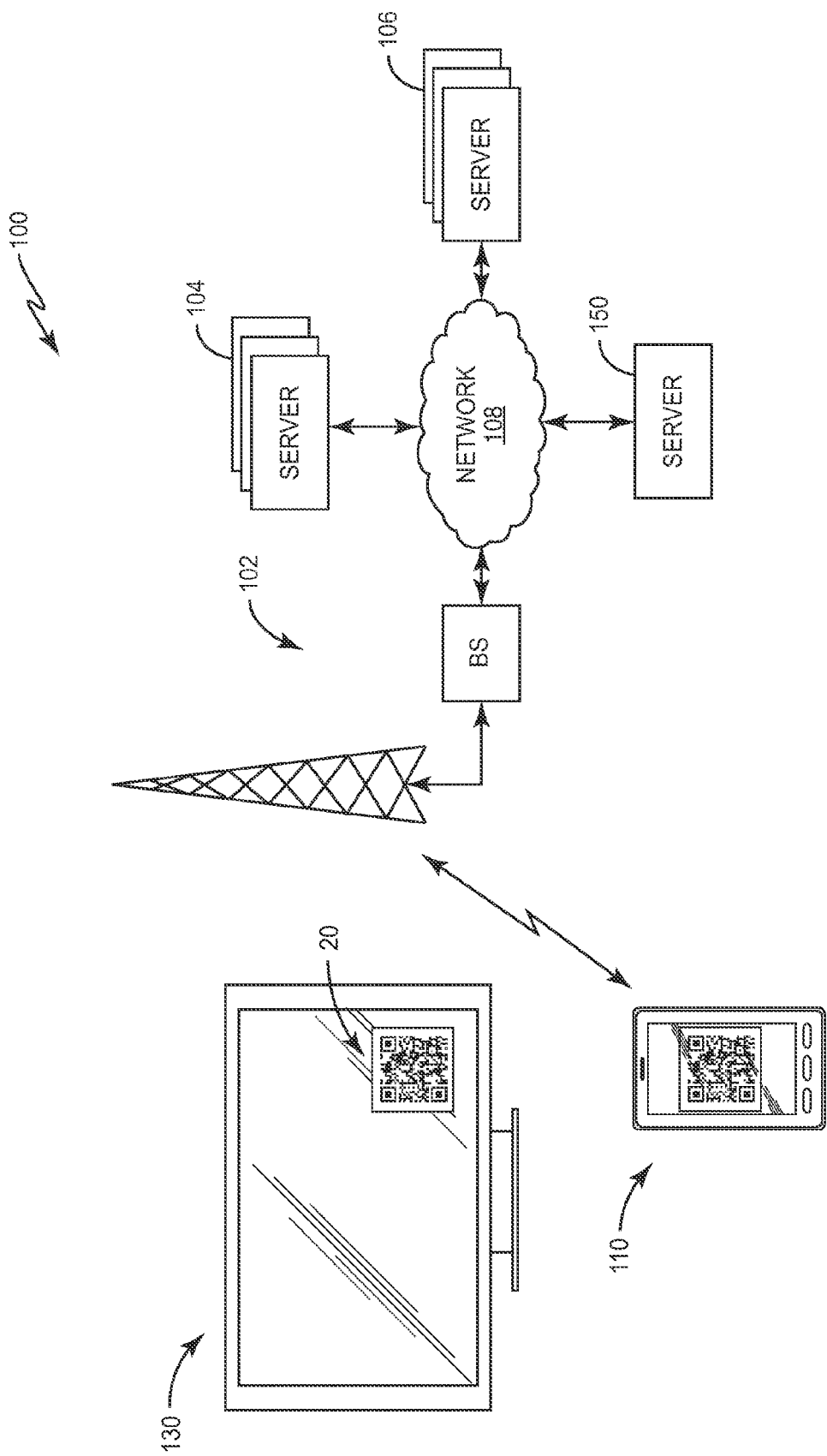
FIG. 9 is a block diagram illustrating a communications system configured to operate according to another embodiment of the present invention.

FIG. 9 is a block diagram illustrating some of the components of a communications system 100 configured to operate according to one embodiment of the present invention. As seen in FIG. 9, system 100 comprises a wireless communications network 102 connected to a packet data network 108, and a plurality of servers 104, 106, 150 connected to network 108. The servers 104, 106 may be, for example, host servers for hosting web pages and other functions or services that the user of device 110 wishes to access. Both the user device 110 and the device 130 may communicate with any of the servers via network 102 and/or network 108 as is previously described.

As described in the previous embodiments, server 150 communicates with devices 110 and 130, and generated the parameters and QR codes 20 for delivery to device 130. However, the present invention is not so limited. As can be seen in FIG. 9, server 150 may generate these artifacts itself, or may utilize one or more of the other servers 104, 106 for this task. For example, in one embodiment, server 150 generates the random number, the session ID, and the URIs, and then sends the parameters to one of the other servers 104, 106 for it to generate the QR code. In another embodiment, one or more of the servers 104, 106 provide the random number, the session ID, and the URIs to server 150, which then uses the parameters to generate the QR code. In either case, the generated QR code 20 is sent to the device 130, and scanned by the user with device 110. Once scanned, the parameters are returned to server 150, which then authenticates the device 110, and establishes one or more communications channels between device 110 and device 130 via itself, or one of the other servers 104, 106.

In another embodiment, the user may use device 110 to purchase an item from a store. In this embodiment, a QR code 20 could be generated and displayed to the user as previously described. To complete a purchase, the user could scan the QR code with device 110, allow device 10 to process the file, and send the parameters to one of the network servers via network 102. When generating the QR code, server 150 could embed the URI of a specific server with which the device 110 should establish the communication channel. Once established, device 110 could transmit the information and/or authorization for payment automatically without the user having to manually enter any information.

Alternatively, the information embedded in the QR code 20 could be scanned and extracted, and then used to populate a text-based Short Message Service (SMS) message. Once the SMS message is populated, device 110 would send the SMS message to a server identified in the QR code 20 to authorize payment. Notably, server 150 would know the values extracted from the QR code and be able determine the identity of user device 110 simply from the values of the parameters.

Figure 10:
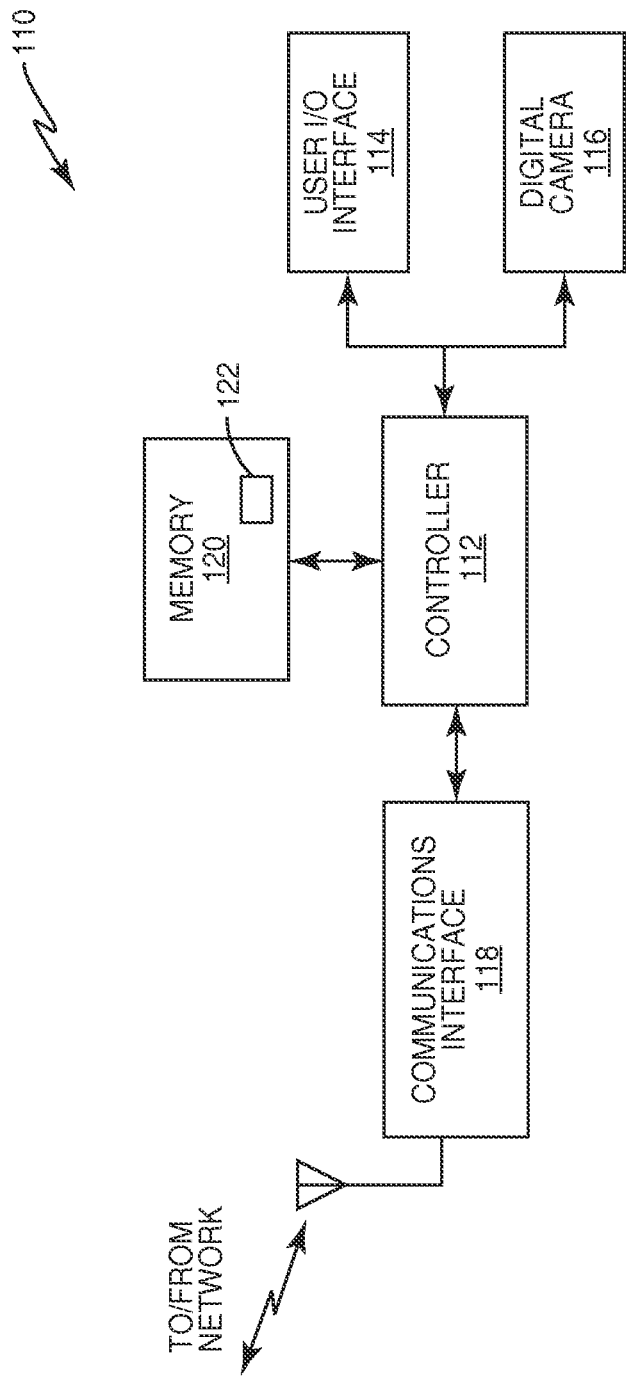
FIG. 10 is a block diagram illustrating some of the components of a user device configured to operate according to one embodiment of the present invention

FIG. 10 is a block diagram illustrating some of the components of a user device 110 configured according to one embodiment of the present invention. Device 110 was described previously as being a cellular telephone. However, this is for illustrative purposes only. The present invention is also suitable for use in other communications devices including, but not limited to, satellite telephones, Personal Digital Assistants (PDAs), and computing devices such as laptop and notebook computers, and tablet computing devices.

As seen in FIG. 10, device 110 comprises a controller 112, a user I/O interface 114, digital camera circuitry 116, one or more communications interfaces 118, and a memory 120. Controller 112 may be, for example, one or more general purpose or special purpose microprocessors that control the operation and functions of device 110 in accordance with program instructions and data stored in memory 120. In one embodiment of the present invention, the controller 112 executes an image processing program 122 to analyze and extract parameters from and image of a QR code 20. Based on this information, controller 112 is programmed to establish a communications channel with server 150 and/or device 130.

User I/O interface 114 enables a user to input information into device 110 and includes devices and controls that facilitate such interaction. Typically, the user I/O interface 114 includes a display (e.g., a touch-sensitive display) that allows the user to view information such as dialed digits, images, call status, menu options, and other service information. In some embodiments, the user I/O interface 114 may also include a keypad that allows the user to enter digits and other alphanumeric input.

The camera circuitry 116 functions to capture images of objects such as QR code 20. Although not specifically seen in FIG. 10, the digital camera circuitry 116 generally includes components such as a lens assembly, an image sensor, and an image processor. In operation, light entering the lens assembly is focused onto the image sensor, which may be, for example, a charge-coupled device (CCD) or a complementary metal oxide semiconductor (CMOS) image sensor. The image processor, if present, then processes the raw image data captured by the image sensor for subsequent storage in memory 114 or for output to a display. According to the present invention, the image processor analyzes the captured image of the QR code 20 and extracts the parameters embedded therein. The parameters are then sent to the communications interface for transmission to the server 150, as previously described.

The communications interface 118 may be a fully functional cellular radio transceiver for transmitting signals to and receiving signals from a base station or other access node in a wireless communications network. Those skilled in the art will appreciate that the communications interface 118 may implement any one of a variety of communication standards including, but not limited to, the standards known as the Global System for Mobile Communications (GSM), the General Packet Radio Service (GPRS), cdma2000, Universal Mobile Telecommunications System (UMTS), Wideband Code Division Multiple Access (WCDMA), 3GPP Long Term Evolution (LTE), Worldwide Interoperability for Microwave Access (WiMAX), and Wireless Local Area Network (WLAN) or other 802.11x interface.

In addition to, or in lieu of, the communications interface being a cellular transceiver, the communications interface may also include a short-range transceiver operating according to the BLUETOOTH protocol. As is known in the art, BLUETOOTH is a universal radio interface that enables two or more wireless devices, such as device 110 and device 130, to communicate wirelessly via short-range ad hoc networks.

As discussed previously, the device 110 may establish a direct, short-range communication link with device 130 using this short-range communication transceiver.

Figure 11:
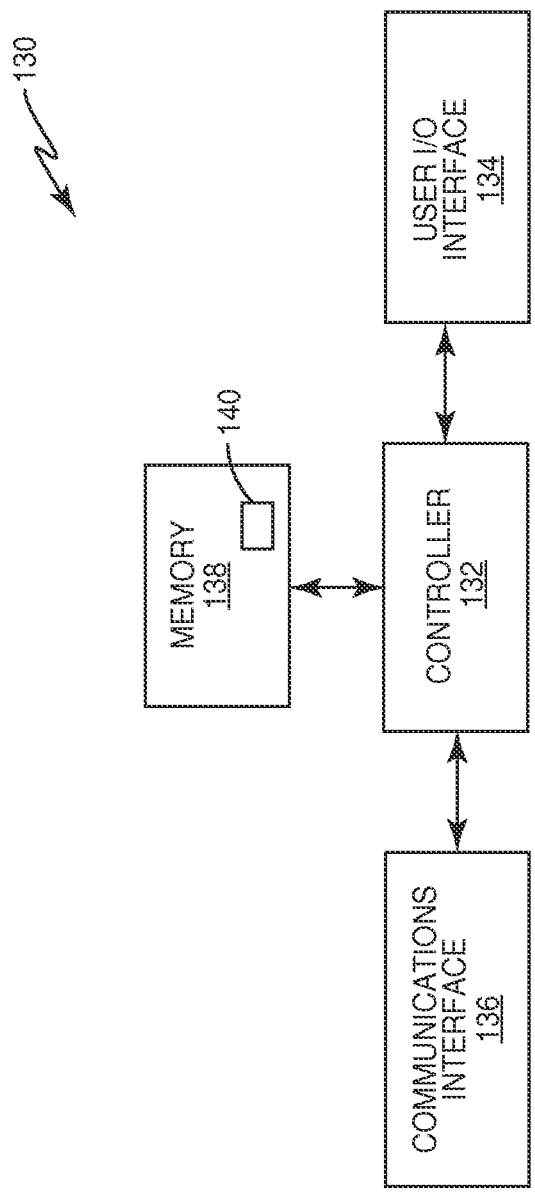
FIG. 11 is a block diagram illustrating some of the components of a consumer electronic device configured to operate according to one embodiment of the present invention.

FIG. 11 illustrates some of the components of device 130. As discussed in the previous embodiments, device 130 may be a personal computing device, or a web-enabled TV. However, the present invention is not limited to these embodiments. In other embodiments for example, the device 130 is a tablet computing device.

Device 130 generally comprises a controller 132, a memory 138, a user I/O interface 134, and a communications interface 136. The operation of these components is similar to those described previously. Therefore, they will not be discussed further here. It is sufficient, however, to note that the memory 138 comprises a browser application 140 that, when executed by controller 132, causes device 130 to generate and transmit certain messages to server 150. Specifically, the browser application 140 may generate HTTP GET messages to request a random number from server 150 whenever the user enters the URI of a web site. As described previously, this HTTP GET message is the trigger that causes the server to generate the parameters for the QR code 20, and respond with an HTTP message containing the QR code 20 for display.

Figure 12:
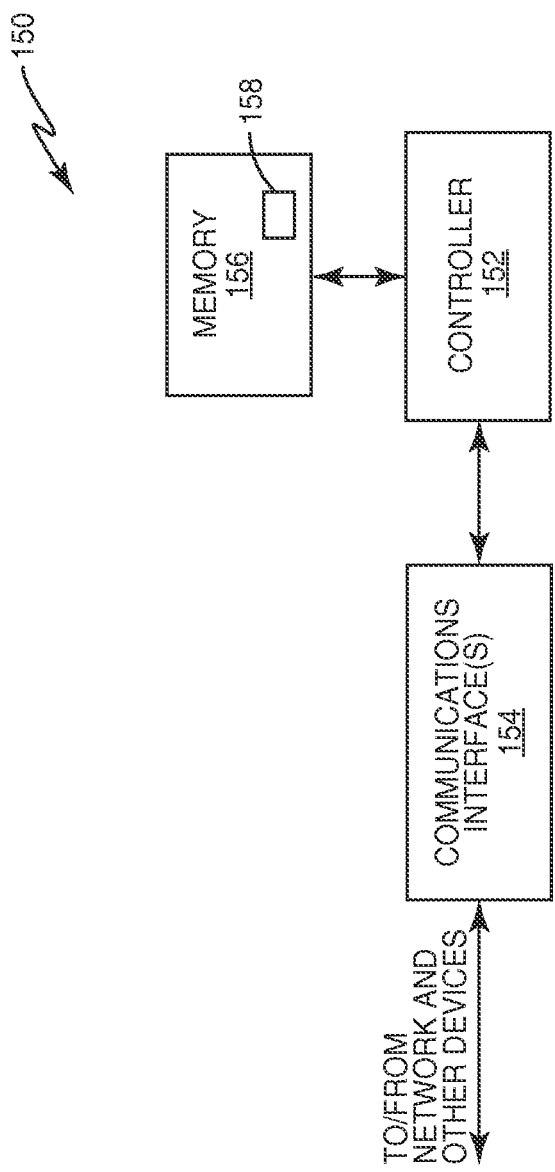
FIG. 12 is a block diagram illustrating some of the components of a network server configured to operate according to one embodiment of the present invention.

FIG. 12 is a block diagram illustrating some of the components of server 150 configured according to one embodiment of the present invention. As seen in FIG. 12, server 150 comprises, inter alia, a controller 152, a communications interface 154, and a memory 156. The memory 156 may further store a software module 158. The controller 152 and communications interface 154 operate as previously described. However, the software module 158 configures controller 152 of server 150 to generate the parameters and the QR code 20, as previously described. In addition to generating these artifacts in response to a request from device 130, software module 158 also causes the controller 152 to generate new parameters and QR codes whenever the user performs a predefined action from device 110 or device 130 such as refreshes a web page, for example.

The present invention may, of course, be carried out in other ways than those specifically set forth herein without departing from essential characteristics of the invention. For example, the previous embodiments describe the use of a 2-dimensional QR code generated to include data parameters such as a random number, a session ID, and one or more URIs. In other embodiments, however, a conventional, horizontally arranged barcode is generated according to some or all of these parameters. In at least one embodiment, the present invention generates a 3-dimensional QR code to include the parameters. The 3-dimensional QR codes are similar to that of the 2-dimensional bar codes in that information is stored/embedded in both the vertical and horizontal directions. However, the 2-dimensional QR codes are black and white, whereas the 3-dimensional QR codes have a variety of different colors. Specifically, modules 24 in the data area 22 of a 3-dimensional QR code may be generated to have a specific color. The specific colors used could be determined by the data parameters used to generate the 3-dimensional code.

In another embodiment, the present invention utilizes a predefined set of images to function as the QR code. Particularly, the server 150 could be configured to store a vast number of different images. Each image would be associated with a specific session ID and random number. In operation, the server 150 would send one or more images to device 130 for display to a user responsive to receiving the user request for a web page. Once displayed, the user would employ the camera circuitry on the device to capture the images. The user's device could be configured to process the images and extract data from the images and send it to the server 150, or to send the captured image to the server 150 for processing. The server 150 could compare the received images to a database of images, and determine parameters that are associated with the image or sequence of images. Upon a locating match, the server 150 could utilize data or information associated with the match to establish the communication session and authenticate the device 110.

In another embodiment, the present invention utilizes a color bar code to switch between different colors and or luminescence. More specifically, the server 150 could assign each color a unique value. The server 150 could also assign unique values for different levels of luminescence. For example, the color red could be assigned a value of '00', while blue, green, and yellow could be assigned '01', '10', and '11', respectively. These values could also vary based on different levels of luminescence. Upon receiving a request from device 130, server 150 would generate a unique color and/or luminescence-based code and then send it to device 130. Using the camera of device 130, the user could capture one or more images of the code as the colors changed, or a video of the displayed code. The user's device 130 could then process the captured image and/or video to determine the embedded parameters, and send the parameters to the server 150 so that the session may be established.

Therefore, the present embodiments are to be considered in all respects as illustrative and not restrictive, and all changes coming within the meaning and equivalency range of the appended claims are intended to be embraced therein.

We claim:

1. A method for establishing a communications session between first and second devices, the method performed at a network server and comprising:
   generating a coded image for display at a first device connected to the network server, the coded image including embedded data used to authenticate a second device at the network server;
   sending the coded image to the first device for display to the second device;
   receiving, from the second device, the embedded data extracted from the displayed coded image by the second device;
   authenticating the second device to perform one or more protected functions based on the received embedded data; and
   wherein, based on an authentication result, the method further comprises:
   establishing a data channel between the first and second devices to communicate data from the second device to the first device; and
   establishing a control channel between the first and second devices to communicate control commands from the second device to the first device to allow the second device to control rendering the data at the first device.

2. The method of claim 1 wherein generating the coded image comprises generating a 2-dimensional or 3-dimensional bar code for display at the first device.

3. The method of claim 1 wherein generating the coded image comprises selecting an image from a predetermined pool of images for display at the first device.

4. The method of claim 1 wherein generating the coded image comprises:
   generating a pattern of one or more colors, each color having an assigned luminescence value that identifies a selected level of luminescence for the color; and configuring the pattern to change one or more of the colors and/or one or more of the luminescence values in a pre-defined order while the coded image is displayed at the first device.

5. The method of claim 1 wherein generating a coded image for display at the first device comprises generating the coded image responsive to receiving a request for the coded image from the first device.

6. The method of claim 1 wherein receiving the embedded data comprises receiving the embedded data in an authentication request, from the second device, to communicate with the first device.

7. The method of claim 6 wherein authenticating the second device based on the received embedded data comprises:
comparing the embedded data received in the authentication request to the embedded data used to generate the coded image at the network server; and
authorizing the second device to perform the one or more protected functions based on a result of the comparison.

8. The method of claim 1 wherein establishing the control channel and the data channel between the first and second devices comprises establishing one or both of the control channel and the data channel between the first and second devices via the network server.

9. The method of claim 1 further comprising:
receiving an indication of whether the first and second devices were able to directly establish one or both of the control channel and the data channel; and
establishing the control channel and/or the data channel between the first and second devices via the network server based on the received indication.

10. The method of claim 1 further comprising:
generating another coded image for display at a third device connected to the network server, the coded image including embedded data used to authenticate a fourth device at the network server;
sending the coded image to the third device for display to the fourth device;
receiving, from the fourth device, the embedded data extracted from the displayed coded image by the fourth device; and
authenticating the fourth device based on the received embedded data.

11. The method of claim 10 further comprising:
establishing a data channel between the second and third devices to communicate data from the second device to the third device;
establishing a control channel between the second and third devices to communicate control commands from the second device to the third device to allow the second device to control rendering the data at the third device.

12. A network server and comprising:
a communications interface to communicate with a user device and a display device via a communications network;
a memory; and
a programmable Processing circuit configured to:
generate a coded image for display at the display device, the coded image including embedded data used to authenticate the user device at the network server;
send the coded image to the display device for display to the user device; receive, from the user device, the embedded data extracted from the displayed coded image by the user device;
authenticate the user device to perform one or more protected functions based on the received embedded data; and wherein based on the authentication result, the processing circuit is further configured to:
establish a data channel between the user device and the display device to communicate data from the user device to the display device; and
establish a control channel between the user device and the display device to communicate control commands from the user device to the display device to allow the user device to control rendering the data at the display device.

13. The network server of claim 12 wherein the coded image comprises a 2-dimensional or 3-dimensional bar code for display at the first device.

14. The network server of claim 12 wherein the coded image comprises an image selected from a predetermined pool of images stored in the memory.

15. The network server of claim 12 wherein the coded image comprises a pattern of one or more colors, each color having an assigned luminescence value that identifies a selected level of luminescence for the color, and wherein the processing circuit is further configured to generate the pattern to change one or more of the colors and/or one or more of the luminescence values in a pre-defined order while the coded image is displayed at the display device.

16. The network server of claim 12 wherein the processing circuit is further configured to generate the coded image responsive to receiving a request for the coded image from the display device.

17. The network server of claim 16 wherein the processing circuit is further configured to receive the embedded data from the user device in an authentication request to communicate with the display device.

18. The network server of claim 16 wherein the processing circuit is further configured to:
compare the embedded data received in the authentication request to the embedded data used to generate the coded image; and
authorize the user device to perform the one or more protected functions based on a result of the comparison.

19. The network server of claim 12 the processing circuit is further configured to establish one or both of the control channel and the data channel between the first and second devices via the network server.

20. The network server of claim 12 wherein the processing circuit is further configured to:
receive an indication of whether the user device and the display device were able to directly establish one or both of the control channel and the data channel; and
establish the control channel and/or the data channel between the user device and the display device via the network server based on the received indication.

21. The network server of claim 12 wherein the user device and the display device comprise a local user device and a local display device, and wherein the processing circuit is further configured to:
generate a second coded image for display at a remote display device connected to the network server, the second coded image including embedded data used to authenticate a remote user device at the network server;
sending the second coded image to the remote display device for display to the remote user device;
receiving, from the remote user device, the embedded data extracted from the displayed second coded image by the remote user device; and
authenticating the remote user device based on the received embedded data.

22. The network server of claim 21 wherein the processing circuit is further configured to:
- establish a data channel between the local user device and the remote display device to communicate data from the local user device to the remote display device;
- establish a control channel between the local user device and the remote display device to communicate control commands from the local user device to the remote display device to allow the local user device to control rendering the data by the remote display device.

* * * * *